US011424528B2

(12) United States Patent
Fang et al.

(10) Patent No.: US 11,424,528 B2
(45) Date of Patent: Aug. 23, 2022

(54) META-STRUCTURE ANTENNA SYSTEM FOR NEW GENERATION WIRELESS NETWORKS IN MOVING VEHICLES

(71) Applicant: Metawave Corporation, Carlsbad, CA (US)

(72) Inventors: Jun Fang, Carlsbad, CA (US); Maha Achour, Carlsbad, CA (US)

(*) Notice: Subject to any disclaimer, the term of this patent is extended or adjusted under 35 U.S.C. 154(b) by 16 days.

(21) Appl. No.: 17/047,574

(22) PCT Filed: Apr. 17, 2019

(86) PCT No.: PCT/US2019/027997
§ 371 (c)(1),
(2) Date: Oct. 14, 2020

(87) PCT Pub. No.: WO2019/204528
PCT Pub. Date: Oct. 24, 2019

(65) Prior Publication Data
US 2021/0119327 A1    Apr. 22, 2021

Related U.S. Application Data

(60) Provisional application No. 62/659,130, filed on Apr. 17, 2018.

(51) Int. Cl.
H01Q 1/32       (2006.01)
H01Q 1/38       (2006.01)
H01Q 15/00      (2006.01)
H01Q 21/06      (2006.01)
H01Q 21/29      (2006.01)
H04B 1/00       (2006.01)
(Continued)

(52) U.S. Cl.
CPC ....... *H01Q 1/3275* (2013.01); *H01Q 15/0086* (2013.01); *H01Q 21/06* (2013.01);
(Continued)

(58) Field of Classification Search
CPC .. H01Q 1/3275; H01Q 15/0086; H01Q 21/06; H01Q 21/29; H01Q 3/36;
(Continued)

(56) References Cited

U.S. PATENT DOCUMENTS 7,764,232 B2 * 7/2010 Achour ............... H01Q 21/065
343/700 MS
9,312,946 B2 * 4/2016 Van Phan ............. H04W 16/26
(Continued)

FOREIGN PATENT DOCUMENTS

EP          2975694 A1      1/2016

OTHER PUBLICATIONS

Increasing the Directivity of Resonant Cavity Antennas with Nearfield Transformation Meta-Structure Realized with Stereolithograpy. Sujan Shrestha et al. (Year: 2021).*
(Continued)

*Primary Examiner* — Vibol Tan
(74) *Attorney, Agent, or Firm* — Sandra Lynn Godsey

(57) ABSTRACT

Examples disclosed herein relate to a meta-structure ("MTS") antenna system for next generation wireless networks in moving vehicles. The MTS antenna system includes an MTS antenna mounted on an exterior surface of the moving vehicle and comprising an MTS array of MTS cells, and an internal gateway for communicating wireless signals to the MTS antenna.

20 Claims, 9 Drawing Sheets

(51) Int. Cl.
*H04B 1/3822* (2015.01)
*H04B 7/0408* (2017.01)

(52) U.S. Cl.
CPC ........... *H01Q 21/29* (2013.01); *H04B 1/0064* (2013.01); *H04B 1/3822* (2013.01); *H04B 7/0408* (2013.01)

(58) Field of Classification Search
CPC .. H04B 1/0064; H04B 1/3822; H04B 7/0408; G01S 5/10
See application file for complete search history.

(56) References Cited

U.S. PATENT DOCUMENTS

| | | | | |
|---|---|---|---|---|
| 10,854,985 | B2* | 12/2020 | Achour | H01Q 15/0026 |
| 10,901,149 | B2* | 1/2021 | Kim | G02B 6/12014 |
| 11,005,192 | B2* | 5/2021 | Dani | H01Q 21/005 |
| 11,105,918 | B2* | 8/2021 | Achour | H01Q 1/3233 |
| 2008/0258993 | A1 | 10/2008 | Gummalla et al. | |
| 2009/0058729 | A1 | 3/2009 | Jo | |
| 2016/0046308 | A1 | 2/2016 | Chung et al. | |
| 2016/0219539 | A1 | 7/2016 | Kim et al. | |
| 2016/0249233 | A1* | 8/2016 | Murray | H04W 16/26 |
| 2017/0199269 | A1 | 7/2017 | Allen et al. | |
| 2017/0339575 | A1 | 11/2017 | Kim et al. | |

OTHER PUBLICATIONS

Alvaro Morales et al. 'Beam Steering application for W-band data links with moving targets in 5G wireless networks.' Journal of Communications and Information Networks, Jun. 2017, vol. 2, No. 2, pp. 91-100. See pp. 92-95 and figure 1.

* cited by examiner

ND-STRUCTURE ANTENNA SYSTEM FOR NEW GENERATION WIRELESS NETWORKS IN MOVING VEHICLES

CROSS-REFERENCE TO RELATED APPLICATIONS

This application is a U.S. national stage application under 35 U.S.C. § 371 of International Patent Application No. PCT/US2019/027997, filed on Apr. 17, 2019, which claims priority to U.S. Provisional Application No. 62/659,130, filed on Apr. 17, 2018, and incorporated herein by reference in their entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, a new wireless standard known as 5G has been designed for deployment in the near future. The 5G standard extends operations to millimeter wave bands, which covers frequencies between beyond 6 GHz, and to planned 24 GHz, 26 GHz, 28 GHz, and 39 GHz, and up to 300 GHz, all over the world.

Millimeter wave frequencies have narrow wavelengths in the range of −1 to 10 mm that are susceptible to high atmospheric attenuation and have a short range (just over a kilometer). In these frequencies, array antennas present several advantages in high gain, narrow beams, and beam steerability. For dense-scattering areas, due to multipath, shadowing and geographical obstructions, blind spots may exist. In remote areas where the ranges are larger and sometimes extreme climatic conditions with heavy precipitation occur, environmental conditions would prevent operators from using large array antennas due to strong winds and storms. Add these conditions to the movement of users in need of wireless services, and a challenge is created for 5G networks to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A Meta-Structure ("MTS") antenna system for deployment in new generation (e.g., 5G) wireless networks is disclosed. The MTS antenna system is suitable for many different applications and can be deployed in a variety of different environments and configurations. In various examples, the MTS antenna system is implemented in a new generation wireless network for moving vehicles, e.g., cars, buses or trains, including high-speed trains. High-speed trains, as generally used herein, operate in speeds well in excess of 100 Km/h and travel through numerous wireless base stations or cells along their path. Providing broadband services in moving vehicles such as high-speed trains require both high speed and highly reliable two-way signal transmissions between network nodes (e.g., eNodeB for 4G LTE or 5G, Wi-Fi Access Points ("APs"), etc.) and user devices in the vehicles. The MTS antenna system is designed to provide a high gain and generate focused beams with improved directivity and reduced undesired radiation patterns such as side lobes. The high gain and focused beams enable better performance and more seamless handoffs between the numerous base stations and cells along a vehicle's path.

In various examples, wireless signals may experience large attenuation or blockage through a vehicle's metal body or its windows, which may be tinted, coated with conductive layers and made of glass or other materials. The MTS antenna system disclosed herein addresses this challenge by providing a low-cost and simple active or passive antenna array that is located on the exterior of the vehicle and retransmits wireless signals to a gateway or module internal to the vehicle. In an uplink scenario, wireless signals from the internal gateway are relayed to the base station radios through this active/passive transmit antenna array.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
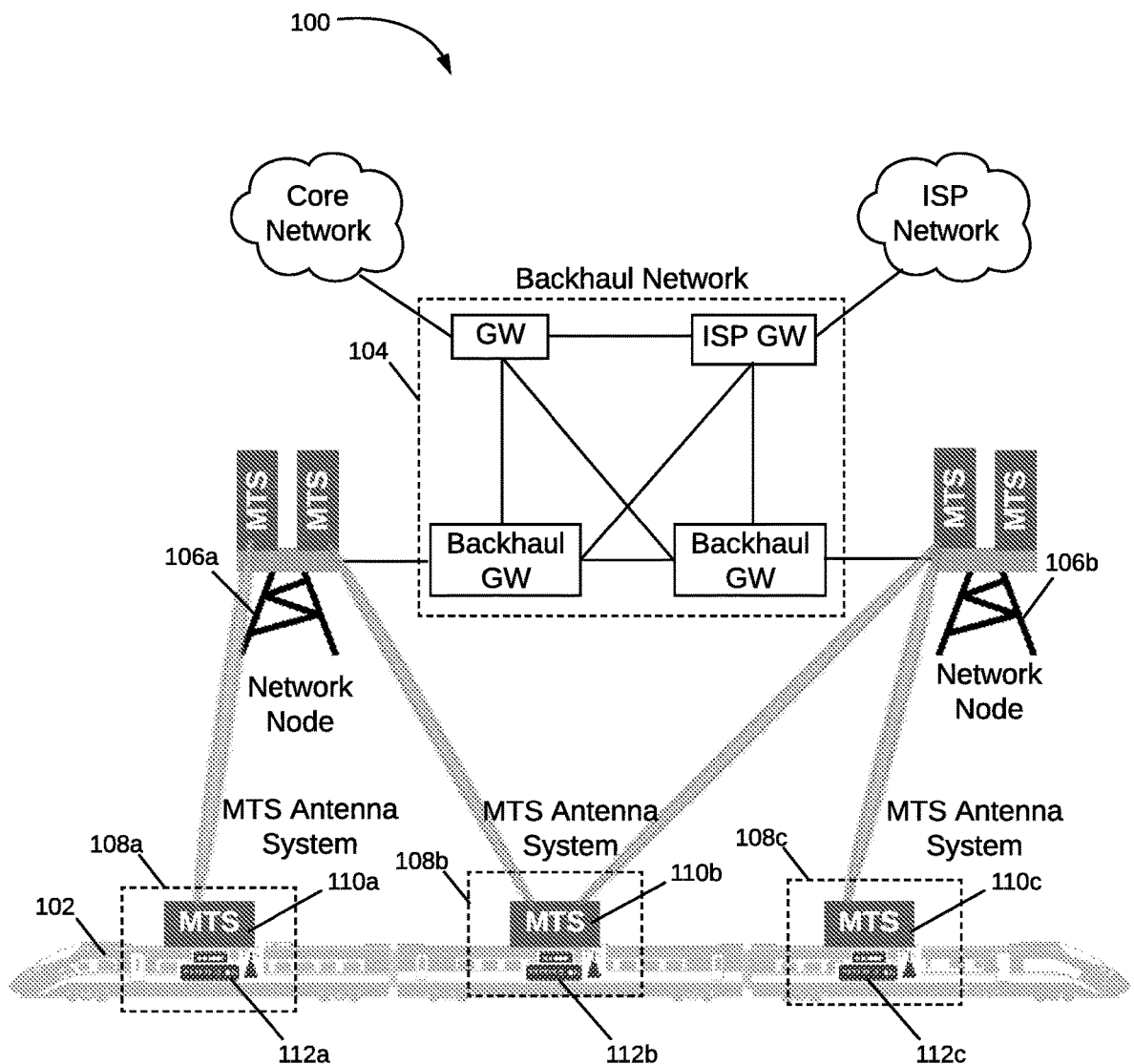
FIG. 1 illustrates a schematic diagram of an MTS antenna system for new generation wireless networks in moving vehicles in accordance with various examples.

FIG. 1 illustrates a schematic diagram of an MTS antenna system for new generation wireless networks in moving vehicles. Network 100 is a new generation wireless network (e.g., 5G network) that enables wireless communications for passengers of a moving vehicle, such as, for example, high-speed train 102. The network 100 includes numerous network nodes that provide radio access to a backhaul Internet network or ISP network 104. The network nodes, e.g, nodes 106a-b, may be cellular base stations and/or Wi-Fi APs, providing similar functionality to that of radios mounted on electrical poles. Handoffs may occur between different nodes in the network 100, such as between nodes 106*a* and 106*b*, when vehicle 102 moves along the path of the nodes.

Each network node 106*a-b* in the network 100 transmits data to and receives data from users of devices (e.g., phones, laptops and so on) connected to the network 100, such as passengers in vehicle 102. A node in network 100 transmits data to and receives data from the users via a point-to-point link. In various examples, the network 100 operates in the millimeter wave spectrum designated for next generation wireless networks in the 30 to 300 GHz range. Each network node 106*a-b* in network 100 may include a passive or active MTS phased antenna array for high data throughput, due to their high directivity gain and narrow beams, steerable whenever necessary.

An MTS antenna, as generally described herein, is an array of MTS elements. Each MTS element is an engineered structure with electromagnetic properties not found in nature, where the index of refraction may take any value, and the structure may be aperiodic, periodic, or partially periodic (semi-periodic). The MTS elements manipulate electromagnetic wave phase as function of frequency and spatial distribution and may have a variety of shapes and configurations. The MTS elements may be designed to meet certain specified criteria, including, for example, desired beam characteristics. The MTS antenna may be passive or active.

In some examples, the MTS antenna elements are metamaterial cells in a variety of conductive structures and patterns, such that a received transmission signal is radiated therefrom. Each metamaterial cell may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating electromagnetic waves by blocking, absorbing, enhancing, or bending waves.

In various examples, vehicle 102 is equipped with at least one MTS antenna system, such as systems 108*a-b*. Each MTS antenna system 108*a-c* is capable of transmitting signals to and receiving signals from network nodes 106*a-b* with an MTS antenna located on the exterior part of vehicle 102, such as MTS antennas 110*a-c*, which may be passive, active, or hybrid passive/active antennas in various configurations. The MTS antennas 110*a-c* retransmit wireless signals from the network nodes 106*a-b* to one or more gateways or modules internal to the vehicle 102, such as internal gateway radio module 112*a-c* in MTS antenna systems 108*a-c*. Radio modules 112*a-c* may be either a 4G-LTE or 5G cellular network relay node or a Wi-Fi gateway node. Users/passengers inside the vehicle 102 are covered by the radio modules 112*a-c*, which include functionalities of a relay node as part of the cellular network, or a media gateway, in Wi-Fi configurations. In both configurations, the downlink data are broadcast from the radio modules 112*a-c* in 4G-LTE or 5G cellular bands, or Wi-Fi bands.

Figure 2:
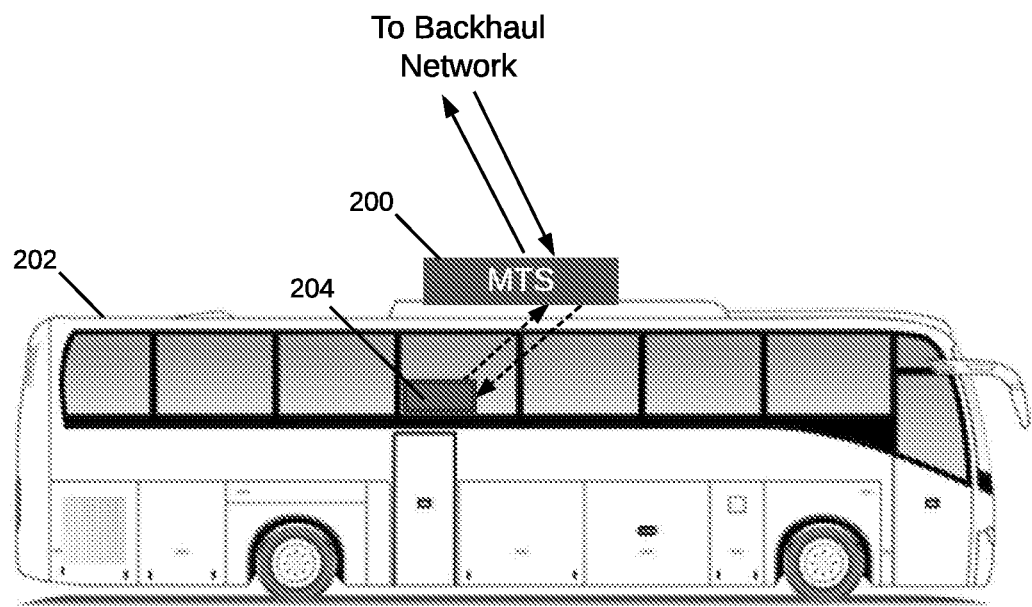
FIG. 2 shows an MTM antenna system mounted on a bus with an internal gateway.

In FIG. 2, an MTS antenna 200 is shown mounted on the exterior of bus 202, having an internal gateway 204. Users in bus 202 are covered by either a 4G-LTE or 5G cellular network relay node equipment, or a Wi-Fi gateway node. The users are covered by a radio module which includes functionalities of a relay node as part of the cellular network, or a media gateway, in Wi-Fi configurations. In both configurations, the downlink data are broadcasted from the internal gateway 204 in 4G-LTE or 5G NR cellular bands, or Wi-Fi bands (2.4 GHz, and 5 GHz), to user devices. The user devices in bus 202 or train 102 are operated in a total transparent way as in stationary locations of the network, either in cellular mode or in Wi-Fi mode.

Figure 3:
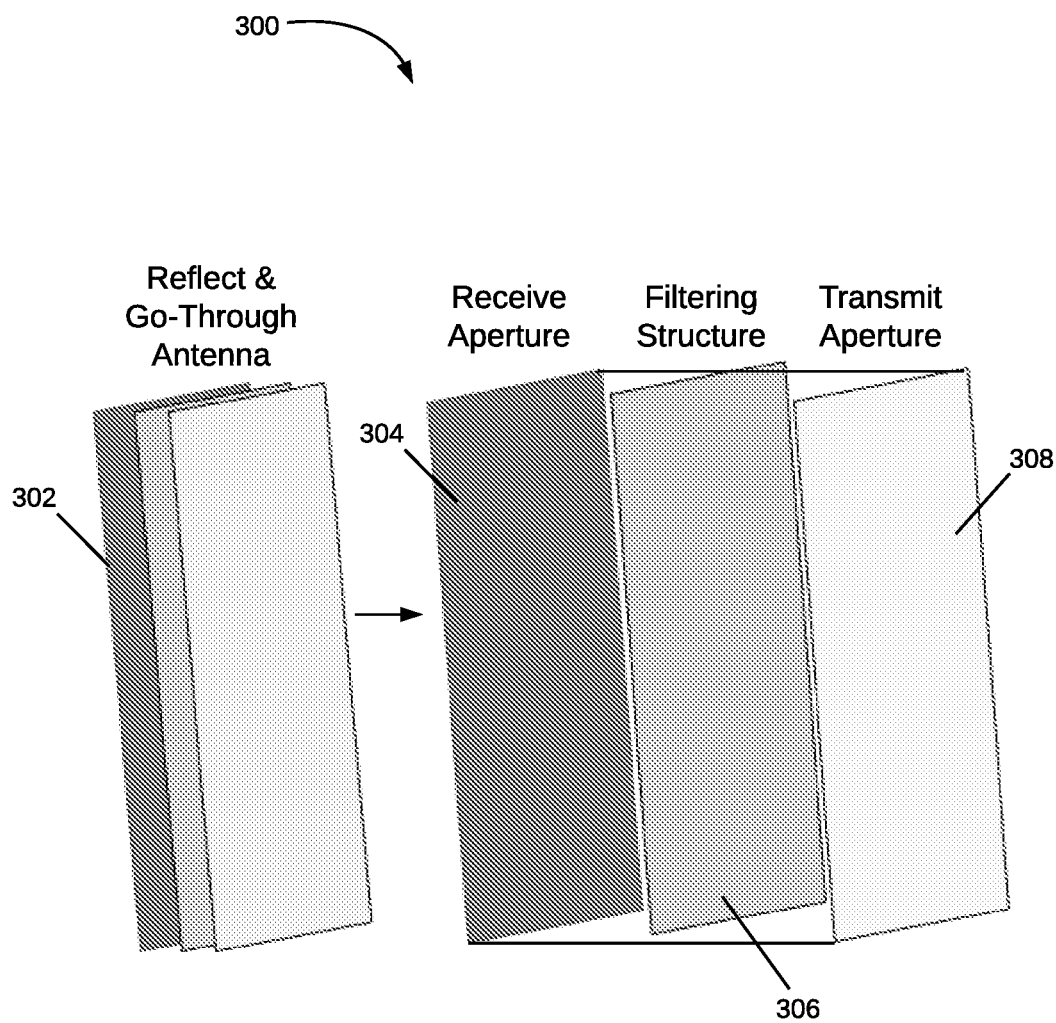
FIG. 3 is a schematic diagram of an example MTS antenna.

FIG. 3 shows an example of an MTS antenna. MTS antenna 302 is able to relay downlink wireless signals from a network node (e.g., nodes 106*a-b*) to a network user inside vehicle 102 or 202. The MTS antenna 302 may be a reflect and go-through antenna that is active or passive, depending on the application. In various examples, the radiation patterns of the MTS antenna 302 are designed to have maximum gain towards the location of the network nodes in network 100 and an internal gateway radio module (e.g., modules 112*a-c*) inside vehicles 102 and 202. The uplink data are collected by the internal gateway radio module and then retransmitted to the network nodes (e.g., nodes 106*a-b*), after necessary processing in physical and MAC layers, such as data reframing, re-multiplexing, re-scheduling, and so on.

Between the network nodes in network 100 and users in vehicles 102 and 202, radio links are used for data transmission in two directions that are based on advanced MTS antennas 302. The MTS antennas 302 operate in a millimeter wave spectrum and provide high data throughput, due to their high directivity gain and narrow beams, steerable whenever necessary. In one example, MTS antenna 302 includes three layers: (1) a receive aperture layer 304; (2) a filtering structure layer 306; and (3) a transmit aperture layer 308. One or more of the layers 304-308 may include an array of MTS cells for providing the steerable and focused beams.

Figure 4:
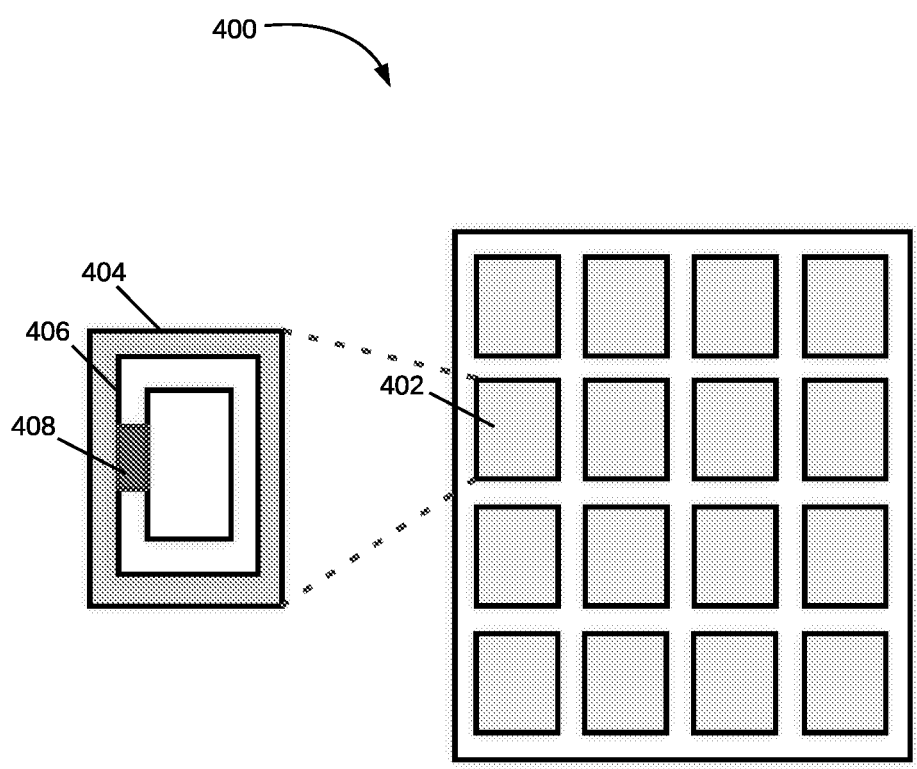
FIG. 4 is a schematic diagram of an array of MTS cells for use in one or more of the layers of FIG. 3.

Attention is now directed at FIG. 4, which shows a schematic diagram of an array of MTS cells for use in one or more of the layers 304-308 of FIG. 3. Array 400 contains multiple MTS cells positioned in one or more layers of a substrate and coupled to other circuits, modules and layers, as desired and depending on the application, including transmission and feed structures incorporating impedance matching elements. The MTS structures may take any of a variety of forms. The MTS cells in array 400, such as MTS cell 402 may be arranged as shown or in any other configuration, such as, for example, in a hexagonal lattice.

MTS cell 402 is illustrated having a conductive outer portion or loop 404 surrounding a conductive area 406 with a space in between. Each MTS cell 402 may be configured on a dielectric layer, with the conductive areas and loops provided around and between different MTS cells. A voltage controlled variable reactance device 408, e.g., a varactor, provides a controlled reactance between the conductive area 406 and the conductive loop 404. The controlled reactance is controlled by an applied voltage, such as an applied reverse bias voltage in the case of a varactor. The change in reactance changes the behavior of the MTS cell 402, enabling the MTS array 400 to provide focused, high gain beams directed to a specific location. An applied voltage effectively maps into a beam steering angle for beams radiated off of the MTS cell 402. In various examples, an MTS antenna can be calibrated to produce a mapping of control voltages to steering angles for directing beams to any desired direction. It is appreciated that additional circuits, modules and layers may be integrated with the MTS array 400.

Figure 5:
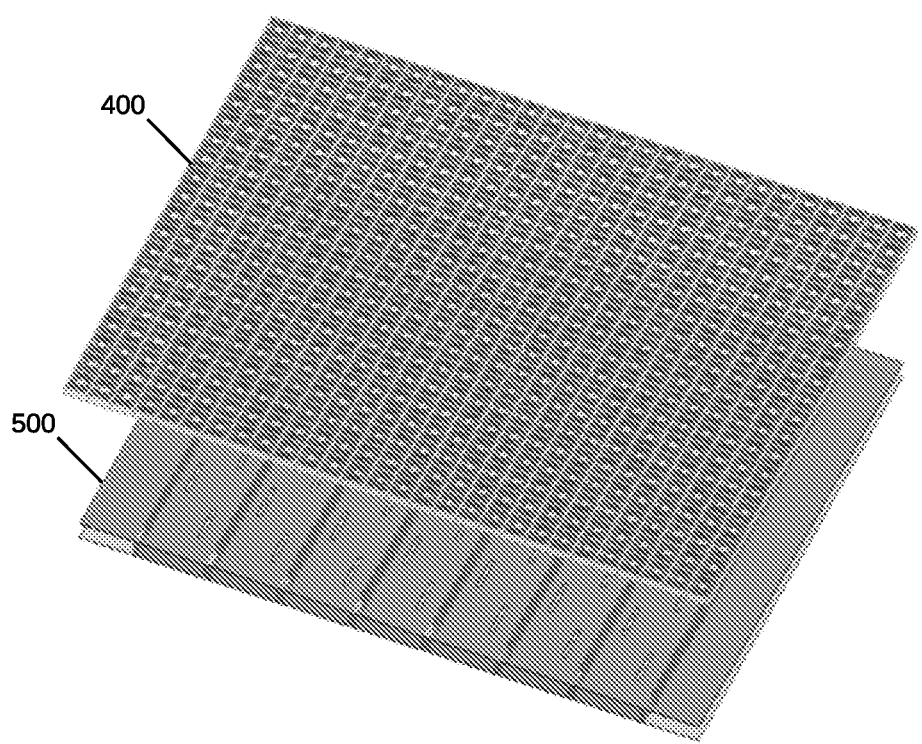
FIG. 5 illustrates an example MTS array positioned proximate a frequency selective surface.

FIG. 5 shows an example of an MTS array 400 positioned proximate slotted transmission lines of a frequency selective surface ("FSS") 500 that may be used in one or more of the layers 304-308 of FIG. 3. The combination of an FSS layer 500 proximate an MTS array 400 provides both azimuth and elevation control of transmission beams. It is noted that MTS array 400 is an active structure as it includes the voltage controlled variable reactance device 408 in MTS cell 402.

Figure 6:
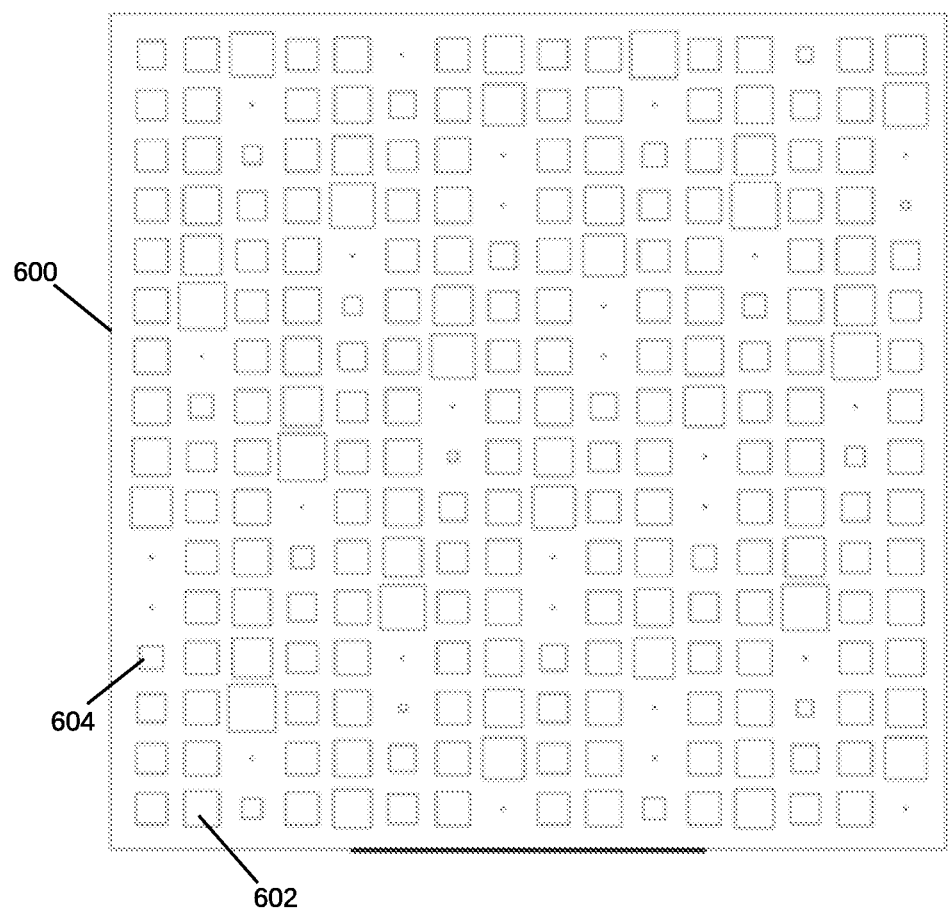
FIG. 6 is a schematic diagram of a passive antenna array in accordance with various examples.

In other configurations, the MTS antennas may include passive antenna arrays, such as illustrated in FIG. 6. A passive antenna array does not require electronics or other controls, as once in position it directs incident beams into a specific direction/angle or directions/angles. To change the angle(s) of a beam may require repositioning the entire directed array. MTS array 600 provides directivity and high bandwidth due to the size and configuration of the individual elements in the array. This enables directivity with a simple design, which in many examples is a patterned configuration. The MTS array 600 is configured with various sized tiles, such as tile 602 and tile 604, each having different dimensions.

It is also noted that due to the high-performance phased array antennas based on meta-structured elements, providing high directivity gain and narrow beam, the communication links from network nodes (e.g., nodes 106*a-b* of FIG. 1) to the MTS antenna systems in the vehicles (e.g., systems 108*a-c* in vehicle 102 of FIG. 1) can support very high data rates. The beams between transmit and receive antennas in network nodes and vehicle antenna systems are required to be kept in high speed relative movement with a high accuracy.

A unique particularity considered in the case of high speed trains is that a train is in a known railway section at any given time instant and the network nodes are located at known locations. If the train receiver possesses an accurate timing information at any time instant, it can calculate and keep its location from a reference point, e.g., a railway station. This is similar to approaches such as Simultaneous Localization and Mapping ("SLAM") systems or navigation systems based on dead reckoning. A high-speed train can also be equipped with an inertia navigation terminal such as an Inertia Measurement Unit ("IMU") and then locate itself and trace its own trajectory along with timing. In all these cases, a high-speed train can calculate the angle of the arriving signal from the network nodes. The range and 3D angles between the two communication parties can be calculated to a reasonable precision, depending on the system configuration and measurement precision, that are related to the antenna systems.

The MTS antenna systems disclosed herein are an efficient solution to high performance, beam steering and tracking phased array antenna operation, in their control and data supporting, for mobile communication networks such as 4G-LTE and 5G cellular systems with vehicles in high mobility such as high-speed trains. For high-speed train applications, based on the fact that both parties of the communication link are within a certain range of each other so that the signal propagation delay is limited, simpler techniques can be used for beam pointing and its keeping by beam steering. First, the locations of the network nodes are accurately known to the moving vehicles. Second, the network nodes can also, to a certain degree of precision, determine and trace the moving vehicles. And third, a moving vehicle, upon receiving a specially designed pilot signal sent from the network nodes, is able to locate itself to a certain precision.

In the proposed system configuration and antenna operation communication procedures and methods, the network nodes periodically transmit a wideband pilot signal with a very low power spectral density to the moving train. Upon receiving the pilot signals, by detecting and processing the pilot signals, the moving train locates and synchronizes itself with the network. In addition, ranging with only one network node is possible when the network timing has been acquired by the moving node.

Once the moving vehicle possesses its own location information, and knowing those of the network nodes, the angles from/to the transmit and receive MTS antennas can be accurately calculated. This enables the MTS antenna systems in the moving vehicle (e.g., systems 108*a-c* of FIG. 1) and the MTS antennas in the network nodes (e.g., nodes 106*a-b* of FIG. 1) to have high directivity and beam steering as desired.

Figure 7:
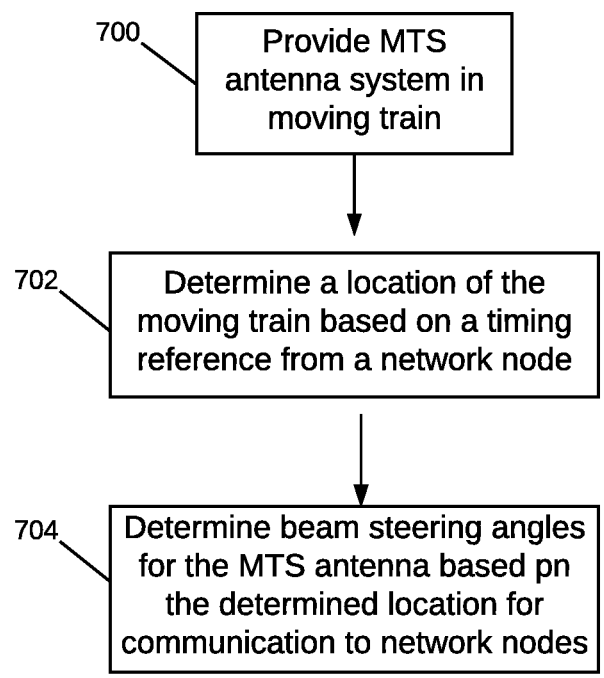
FIG. 7 is a flowchart for providing wireless communications to a moving train in accordance with various examples.

Attention is now directed to FIG. 7, which illustrates a flowchart for providing wireless communications to a moving train in accordance with various examples. First, at least one MTS antenna system is provided in the train (700). The MTS antenna system, as described above, has an MTS antenna mounted on an exterior surface of the train and an internal gateway for enabling high-speed and high reliability wireless communications to users/passengers inside the train. The MTS antenna system is designed to provide a high gain and generate focused beams with improved directivity and reduced undesired radiation patterns such as side lobes. The high gain and focused beams enable better performance and more seamless handoffs between the numerous network nodes along the train's path. The improved directivity of the MTS antenna system enables it to produce high gain beams to any desired direction or angle to reach a network node and thereby meet the goal of seamless wireless connectivity to users/passengers in the train.

As there are numerous network nodes in the route of the moving train, seamless wireless connectivity is achieved by knowing the train location at any given time relative to a network node in its proximity as it moves along its route. The location of the moving train is determined based on a timing reference from a network node (702). The timing reference, as described in more detail below, enables the train clock to be synchronized with the network clock and the train to track the timing as it moves along its path from network node to network node. Once the train's location is determined, the MTS antenna system uses the location to determine beam steering angles to use for communication with the network nodes as the train moves along its path. (704).

In various examples, each network node transmits a wide beam pilot signal in the direction of the moving train. The train communication receiver can receive this signal because of the wide beam width and the pilot signal's wideband design using a spectrum spreading with a pseudorandom sequence (e.g., a PN code). The pilot signal is sent repeatedly and continuously. Its wideband feature makes it to be at a very low power density such that no significant interference would be observed by other radio systems operating in the same spectrum. The wideband pilot signal is based on a sufficiently long PN code, so that it can be detected with sufficiently high probability of detection and very low false alarm probability. In the train's receiver, a Digital Phase Lock Loop ("DPLL") based detector is used to detect the received pilot signal and lock it with a local reference signal with a sliding-window correlator architecture.

Figure 8:
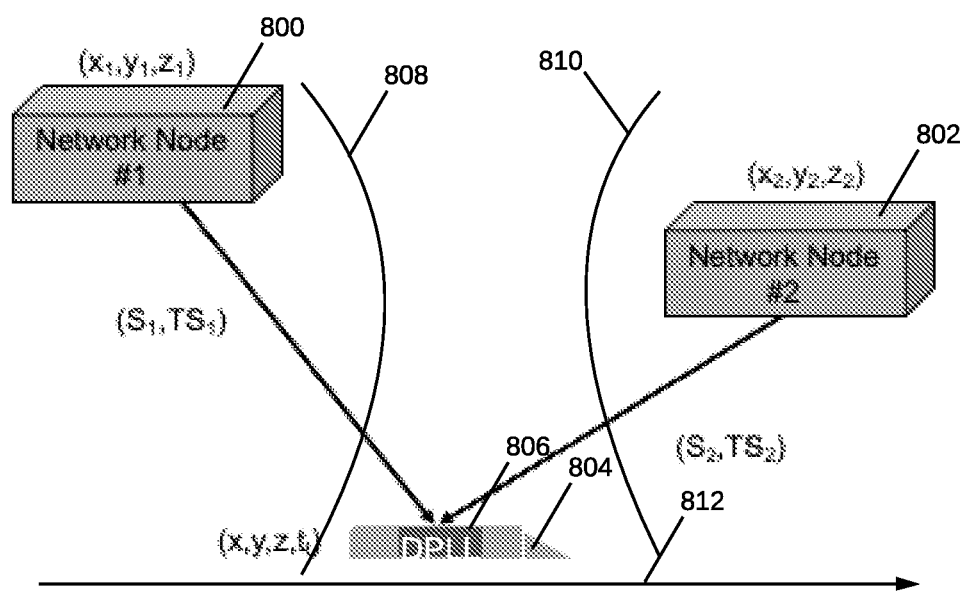
FIG. 8 is a schematic diagram of a moving train connecting to two network nodes in accordance with various examples.

Attention is now directed to FIG. 8, which shows a schematic diagram of a moving high-speed train connecting to two network nodes. It is assumed that the network nodes 800-802 are time-synchronized with a timing reference (master clock) and a timing protocol such as Precision Time Protocol ("PTP") or IEEE 1588. The highly accurate time reference, i.e., the master clock, $\{t_n\}$, can be GPS-based or locally established. The network nodes 800-802 have known, fixed locations expressed in coordinates $\{(x_1, y_1, z_1), (x_2, y_2, z_2)\}$. Moving train 804 has coordinates $(x, y, z, t_t)$, where $\{t_t\}$ indicates its clock, and also a DPLL 806 to detect and lock into pilot signals. Two pilot signals with time stamps $\{(S_1, TS_1), (S_2, TS_2)\}$ are received by the train 804, which knows the time differences of arrival of $S_1$ and $S_2$ based on its clock $t_t$. The train 804 can determine its location at the time when it receives $S_1$, and then it can determine the network clock by combining the Time of Arrival ("ToA") of $S_1$ and $TS_1$. This can be confirmed by the ToA of $S_2$ and $TS_2$, and the clock of the train $t_t$ can be synchronized with the network clock.

Figure 9:
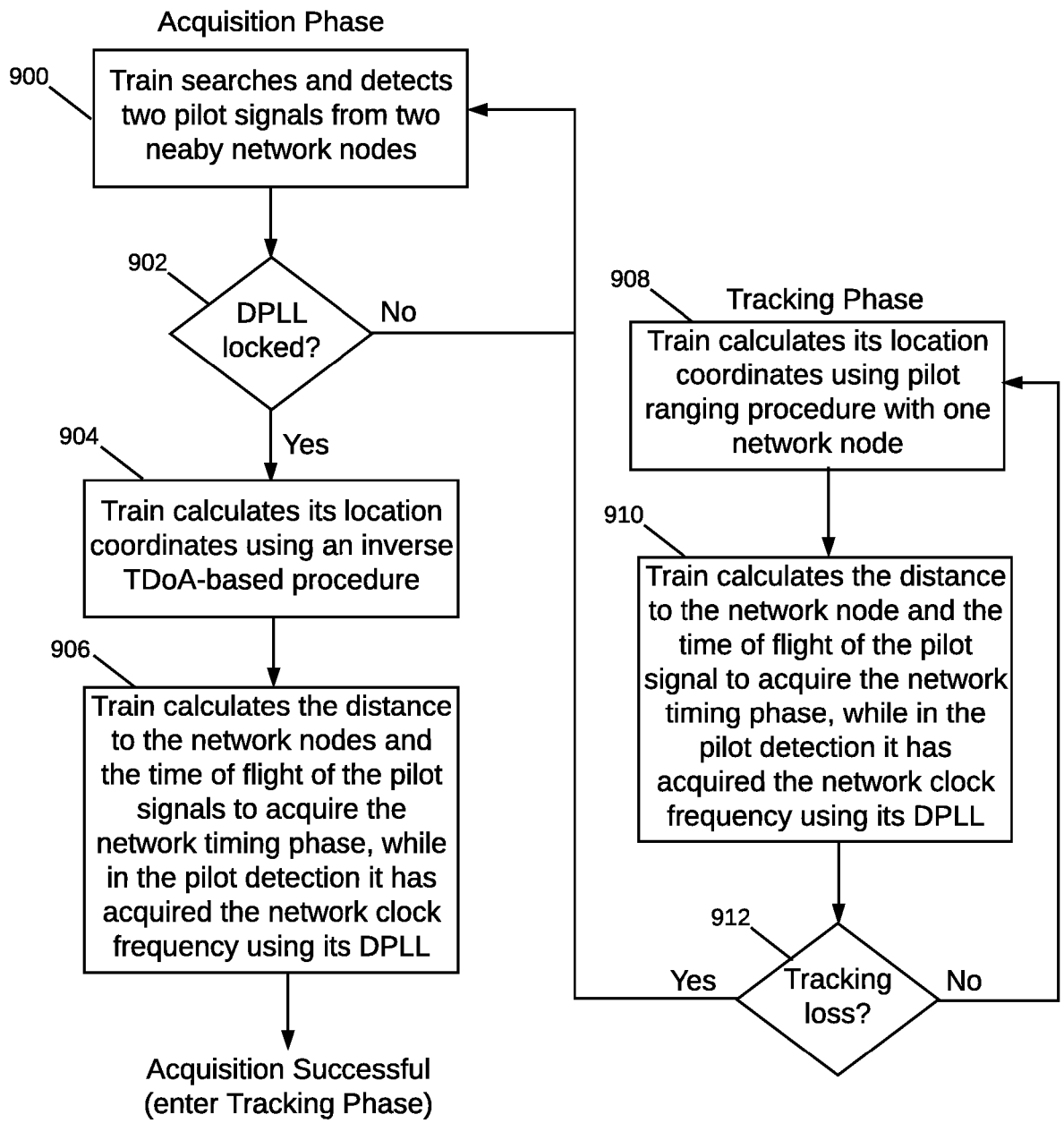
FIG. 9 is a flowchart for determining a location of a moving train in wireless communications with network nodes in accordance with various examples.

FIG. 9 is a flowchart for determining a location of a moving train in wireless communications with network nodes in accordance with various examples. The train's location is determined in two phases: (1) an Acquisition Phase, during which the train acquires a timing reference; and (2) a Tracking Phase, during which the train, having a timing reference, determines its location relative to a nearby network node. The timing reference is necessary for synchronization with the network clock used by the network nodes the train is communicating with. The first step in the acquisition phase is for the train to search and detect two pilot signals from nearby network nodes (900). The train 804 receives two pilot signals ($S_1$, $S_2$) from the two network nodes 800-802 with time stamps ($ST_1$, $ST_2$). The train 804 also knows the ToA of the two pilot signals ($S_1$, $S_2$), which can be denoted as ($tr_1$, $tr_2$). In various examples, the pilot signals ($S_1$, $S_2$) can be a PN-sequence modulated wideband waveforms. This design ensures good reception performance and time accuracy. The local counter of train 804 starts at the instant its DPLL 806 locks the pilot signal from the network nodes 800-802 (902), which means $tr_1$ includes the clock error between the network clock and the local clock of the train communication node, plus the time of flight of the pilot signal. The time stamp ST corresponds to the instant the pilot signal is transmitted.

The pilot signal carries the time stamp and some other useful information, but the time stamp is the minimum necessary message it transmits. The pilot signal might be designed so that an accurate ranging is possible by the train communication node receiver. The train 804 determines its location based on a Time Difference of Arrival ("TDoA") and network timing synchronization as follows (904):

$$\Delta t = (t_{r1} - ST_1) - (t_{r2} ST_2) \quad \text{(Eq. 1)}$$

In case where the network nodes 800-802 are time synchronized, it can be assumed that $ST_1 = ST_2$ so that:

$$\Delta t = (t_{r1}) - (t_{r2}) \quad \text{(Eq. 2)}$$

The train clock may have an error with respect to the network clock, denoted as $\delta t$, so that $t_{r1} = t_{n1} + \delta t$, and $t_{r2} = t_{n2} + \Delta t + \delta t = t_{n1} + \Delta t + \delta t$. With $(tn_1, tn_2)$ being the network time instants corresponding to $(tr_1, tr_2)$, Eq. 2 can be rewritten as:

$$\Delta t = (t_{r1}) - (t_{r2}) = (t_{n1}) - (t_{n2}) \quad \text{(Eq. 3)}$$

That is, $\delta t$ is cancelled, the train clock is not required to be accurately synchronized with the network clock, and the train 804 is still located accurately. In addition, once the train 804 is accurately located, the train clock can be accurately synchronized with the network clock. The train then calculates the distance to the network nodes and the time of flight of the pilot signals to acquire the network timing phase (906). The range difference is thus:

$$\Delta d = c * \Delta t \quad \text{(Eq. 4)}$$

where c is speed of light. With the coordinates of the network nodes 800-802 and the train 804 at time t denoted by $(x_1, y_1, z_1)$, $(x_2, y_2, z_2)$, and $(x_t, y_t, z_t)$, the range difference can also be expressed as a hyperbola (e.g., hyperbolas 808-810) with the following equation:

$$\Delta d = \sqrt{(x_t - x_1)^2 + (y_t - y_1)^2 + (z_t - z_1)^2} - \sqrt{(x_t - x_2)^2 + (y_t - y_2)^2 + (z_t - z_2)^2} \quad \text{(Eq. 5)}$$

Since $\Delta t$ is known and fixed, the train's location is one of the two intersections of the hyperbolas 808-810 with the rail line 812. The rail line 812, in any coordinate system, can be expressed as a mathematical function denoted by $f(x_t, y_t, z_t) = 0$. This function can be tabulated and stored numerically in a database, shared by the network nodes 800-802, as well as by the communication node system in the train 804.

Numeric methods can be used to find out the solutions of the following system:

$$\begin{cases} \Delta d = \sqrt{(x_t - x_1)^2 + (y_t - y_1)^2 + (z_t - z_1)^2} - \sqrt{(x_t - x_2)^2 + (y_t - y_2)^2 + (z_t - z_2)^2} \\ f(x_t, y_t, z_t) = 0 \end{cases} \quad \text{(Eq. 6)}$$

The trajectory function of the rail line 812 is a 3D curve with very limited variation, and for any local area, it can be approximated by a straight section. For the hyperbolas 808-810, linearization can be used to simplify the solution to Eq. 6. It is noted that for any given and fixed $\Delta t$ or $\Delta d$, and $(x_1, y_1, z_1)$, $(x_2, y_2, z_2)$, the nonlinear equation system of Eq. 6 has only two solutions as the two intersection points of the trajectory function and the two hyperbola surfaces 808-810. Fast solutions can be used using prior information about the locations of network nodes 800-802. Solving the equation system of Eq. 6 can be done by many different methods. It is noted that the proposed method as described below can be used in a practical implementation, although it is not the only solution to Eq. 6.

An efficient solution to Eq. 6 can be determined by searching for the intersection point from an initial point at the time instant $t_{r1}$. This is actually very near to $t_{n1}$, the actual time instant when the trajectory function of the train 804 intersects with one of the hyperbola surfaces 808-810. The error corresponds to the timing error between the two clocks. The point on trajectory function $(x_t, y_t, z_t)$ is one solution if it meets the first equation of the nonlinear equation system of Eq. 6 above. The number of search steps is $c * \delta t / Ts$, where Ts is the spatial sampling period of the trajectory function $f(x_t, y_t, z_t) = 0$, which is tabulated at each Ts (m). For example, if $\delta t$ is 0.5 $\mu s$, Ts=0.5 m, the number of steps is 300. If 30000 searches per second are performed, the time to solution finding is about 0.1 milliseconds.

Once one of the two solutions is found, the same searching is done using another starting point corresponding to $t_{r2}$. The two solutions of the above-outlined equation system create, however, a location ambiguity. This ambiguity can be resolved easily by calculating the two terms in the above Eq. 6 and comparing them. If the first term is smaller, the train is nearer to network node 800, and vice versa (nearer to network node 802). This is a prior information about the relative positioning between the train and the two network nodes.

Note that it can be shown that taking one of the two solutions will result in the same functionality. In case the location of train 804 at the time instant is taken wrongly, the proposed time synchronization procedure and the location method will still work by taking the distance between the two intersection points for a correction factor. Based on the time stamps ($ST_1$, $ST_2$), and the train coordinates ($x_t$, $y_t$, $z_t$), the ranges between the train and the two network nodes can be calculated and the true time of arrival of the two pilot signals ($tn_1$, $tn_2$) can be found as d(Network Node 1, Train)/c and d(Network Node 2, Train)/c, respectively, at the time instant when the TDoA procedure was started.

Once ($tn_1$, $tn_2$) is obtained, from $t_{r1}=t_{n1}+\delta t$, or $t_{r2}=t_{n2}+\delta t$, $\delta t$ can be found and the train's local clock can be synchronized with the network clock. Note that by the time the train coordinates ($x_t$, $y_t$, $z_t$) have been calculated (904), the train would have been advanced by a certain distance or time. The train can extrapolate its new location from its on-board database by incremented timing relative to the reference point. Once the train has acquired the network clock and a reference point in its trajectory, the referenced timing and location can be periodically updated using the same procedure as described in reference to steps 900-906. Train 804 will keep its location data and be able to retrieve timely the path database for beam steering and tracking, in the form of control voltages, so that its MTS phased array antenna(s) can have an accurate pointing to the MTS antennas in the network nodes. It is noted that as long as the location and timing are achieved by the train receiver, the MTS antenna system in the train will keep a sufficient accurate beam pointing to the beams of the MTS antennas at the network nodes.

It is appreciated that the train 804 locates itself with the help of the pilot signals sent from two network nodes 800-802 that are based both on a unique, highly accurate timing reference. Once the train and network clocks are synchronized, high precision ranging becomes possible using the same pilot signals. The train 804 can then switch to a tracking phase using only one network node in its view. During the tracking phase in steps 908-912, the timing is updated by the train 804 with the periodic time stamps of the network node's pilot signal. Note that in this case, only one network node can assist the train 804 to locate itself by intersecting the circle line with the trajectory function of the rail line 812. The location accuracy depends on the accuracy of the ranging. For example, if the high-speed train's relative speed is about 300 km/h, or 85 m/s, in a frequency band of about 28 GHz as typical in 5G FR2 allocations, the frequency drift is about $\Delta f=8$ kHz, which, relative to the chip rate of the pilot signal, would be only 0.16% in $\Delta f*Tch$, where Tch is the chip time duration for a bandwidth of 5 MHz. The state-of-the-art design of the pilot signal receiver provides the necessary accuracy to meet the beam steering and tracking requirements. Tracking the two or more network nodes can support handover process, by switching the beam of the train's communication antenna from one network node to another one.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A meta-structure ("MTS") antenna system for a moving vehicle, comprising:
    an MTS antenna mounted on an exterior surface of the moving vehicle and comprising a receive aperture, a filtering structure, and a transmit aperture, wherein at least one of the receive aperture, the filtering structure, or the transmit aperture comprises an MTS array of MTS cells; and
    an internal gateway configured to communicate wireless signals to the MTS antenna.

2. The MTS antenna system of claim 1, wherein the MTS array comprises an active antenna array.

3. The MTS antenna system of claim 1, wherein the MTS array comprises a passive antenna array.

4. The MTS antenna system of claim 1, wherein the MTS array radiates directed beams to an MTS antenna in a network node.

5. The MTS antenna system of claim 4, wherein the network node comprises one of a cellular base station or a Wi-Fi access point.

6. The MTS antenna system of claim 1, wherein the MTS cells comprise metamaterial cells.

7. The MTS antenna system of claim 1, wherein the moving vehicle is a train.

8. The MTS antenna system of claim 7, wherein the train determines its location based on a time difference of arrival of two pilot signals sent from two network nodes.

9. A method for providing wireless communications to a moving train, the method comprising:
    providing at least one meta-structure ("MTS") antenna system in the moving train, the MTS antenna system comprising an MTS antenna mounted on an exterior surface of the train and an internal gateway;
    determining a location for the moving train based on a timing reference from a network node; and
    determining beam steering angles for the MTS antenna based on the determined location for communication to the network node.

10. The method of claim 9, wherein the MTS antenna comprises an MTS array of MTS cells.

11. The method of claim 9, wherein determining a location for the moving train based on a timing reference comprises determining a time difference of arrival between a first pilot signal received from the network node and a second pilot signal received from another network node, each network node comprising one of a cellular base station or a Wi-Fi access point.

12. The method of claim 11, further comprising locking a Digital Phase Locked Loop ("DPLL") in the train to the two pilot signals.

13. The method of claim 10, wherein the MTS array comprises an active antenna array.

14. The method of claim 10, wherein the MTS array comprises a passive antenna array.

15. The method of claim 10, further comprising radiating beams with the determined beam steering angles to an MTS antenna in the network node.

16. The method of claim 10, wherein determining a location for the moving train based on a timing reference comprises synchronizing a train clock with a wireless network clock.

17. A wireless communication system for a moving vehicle, comprising:
- a set of network nodes, at least one of the network nodes comprising a first meta-structure ("MTS") antenna system; and
- a second MTS antenna system in the moving vehicle, the second MTS antenna system comprising an MTS antenna mounted on an exterior surface of the moving vehicle,
- wherein the first MTS antenna system and the second MTS antenna system are in communication to provide wireless service to a user inside the moving vehicle, and
- wherein the second MTS antenna system is configured to determine a location for the moving vehicle based on a timing reference transmitted by the first MTS antenna system and determine beam steering angles for the MTS antenna based on the determined location.

18. The wireless communication system of claim 17, wherein the MTS antenna mounted on the exterior surface of the moving vehicle comprises an array of MTS cells.

19. The wireless communication system of claim 18, wherein the array of MTS cells is configured to radiate beams at the beam steering angles to the first MTS antenna system by adjusting a reactance of the array of MTS cells.

20. The wireless communication system of claim 17, wherein the second MTS antenna system further comprises a gateway radio module inside the moving vehicle and in communication with the MTS antenna to provide the wireless service.

* * * * *